(12) United States Patent
Goodworth et al.

(10) Patent No.: US 12,704,216 B2
(45) Date of Patent: Aug. 11, 2026

(54) MAGNETIC STAND MOUNT

(71) Applicant: OLLIN, INC., Shelley, ID (US)

(72) Inventors: Nathan Goodworth, Shelley, ID (US); Paul Wadsworth, Albuquerque, NM (US)

(73) Assignee: OLLIN, INC., Shelley, ID (US)

( * ) Notice: Subject to any disclaimer, the term of this patent is extended or adjusted under 35 U.S.C. 154(b) by 107 days.

(21) Appl. No.: 18/747,450

(22) Filed: Jun. 19, 2024

(65) Prior Publication Data

US 2024/0418308 A1 Dec. 19, 2024

Related U.S. Application Data

(60) Provisional application No. 63/508,998, filed on Jun. 19, 2023.

(51) Int. Cl.
*F16M 11/04* (2006.01)

(52) U.S. Cl.
CPC ................................ *F16M 11/041* (2013.01)

(58) Field of Classification Search
CPC ..... F16M 11/041; F16M 13/022; F16M 11/16
See application file for complete search history.

(56) References Cited

U.S. PATENT DOCUMENTS 5,230,490 A 7/1993 Sloop
7,077,582 B2 7/2006 Johnson
8,830,663 B2 9/2014 Child et al.
8,870,143 B2 10/2014 Kubin
9,243,739 B2 1/2016 Peters
9,357,044 B1 5/2016 Scully et al.
10,304,429 B1 5/2019 Broadbelt et al.
10,327,538 B2 * 6/2019 Alexander ......... A45C 13/1069
10,703,429 B2 * 7/2020 Fiedler ..................... B62J 11/04
10,988,197 B1 * 4/2021 Hamilton .................. F16B 2/10
11,319,978 B2 * 5/2022 Klingler ............. A47B 47/0075
11,378,225 B2 * 7/2022 Laurent ................ H05K 5/0204
11,497,299 B2 11/2022 Vanman et al.
11,548,451 B2 * 1/2023 Jankura ................... H04M 1/04
11,675,254 B2 * 6/2023 Zhou .................... G03B 17/561
396/428

(Continued)

FOREIGN PATENT DOCUMENTS

EP 1160499 5/2000

OTHER PUBLICATIONS

DJI Magnetic Ball-Joint Adapter Mount for Osmo Action 3 & Osmo Action Cameras, https://www.adorama.com/djiosmoa3bja.html, Dec. 24, 2024.

(Continued)

*Primary Examiner* — Bradley Duckworth
(74) *Attorney, Agent, or Firm* — KNH LLP

(57) ABSTRACT

Apparatuses, systems, and methods are disclosed for a magnetic stand mount. An apparatus includes a magnetic stand mount plate comprising a first at least one magnet, the magnetic stand mount plate configured to be coupled to an object. The apparatus includes a magnetic stand mount base comprising a second at least one magnet and configured to be coupled to a stand. The magnetic stand mount plate is selectively coupled to the magnetic stand mount base by magnetic attraction between the first at least one magnet and the second at least one magnet to secure the object to the stand.

17 Claims, 11 Drawing Sheets

(56) References Cited

U.S. PATENT DOCUMENTS

| | | | | |
|---|---|---|---|---|
| 11,796,126 | B2 * | 10/2023 | Chao | F16B 1/00 |
| 11,902,458 | B2 * | 2/2024 | Whitten | F16M 13/022 |
| 11,971,648 | B2 * | 4/2024 | Jankura | F16M 11/32 |
| 12,366,321 | B2 * | 7/2025 | Zhou | F16M 11/18 |
| 2010/0237206 | A1 * | 9/2010 | Barker | F16M 13/08 248/206.5 |
| 2012/0273630 | A1 | 11/2012 | Glilespie-Brown et al. | |
| 2014/0265765 | A1 * | 9/2014 | Khodapanah | F16M 13/00 248/224.8 |
| 2016/0259374 | A1 | 9/2016 | Breiwa et al. | |
| 2016/0266601 | A1 * | 9/2016 | Christensen | G05G 5/12 |
| 2016/0309865 | A1 * | 10/2016 | Chiang | F16M 13/022 |
| 2016/0373152 | A1 * | 12/2016 | Schmidt | H04B 1/3888 |
| 2019/0198212 | A1 * | 6/2019 | Levy | F16M 11/2021 |
| 2021/0353051 | A1 * | 11/2021 | Phifer | F16M 11/2021 |
| 2022/0137491 | A1 | 5/2022 | Stankie et al. | |
| 2023/0098348 | A1 * | 3/2023 | Dufelmeier | G06F 1/166 455/575.1 |
| 2024/0333002 | A1 * | 10/2024 | Hynecek | H02J 50/005 |
| 2025/0325079 | A1 * | 10/2025 | Whitten | B62J 9/21 |

OTHER PUBLICATIONS

Car/Desk—MAG Head, https://www.quadlockcase.com/collections/mag/products/mag-head?variant=42042648756395, Dec. 24, 2024.

* cited by examiner

MAGNETIC STAND MOUNT

CROSS-REFERENCE TO RELATED APPLICATIONS

This application claims the benefit of U.S. Provisional Patent Application No. 63/508,998 entitled "MAGNETIC STAND MOUNT" and filed on Jun. 19, 2023, for Nathan Goodworth, et al., which is incorporated herein by reference

FIELD

The subject matter disclosed herein relates to object stands and more particularly relates to a magnetic mount for an object stand.

BACKGROUND

Object stands, such as bipods, tripods, or the like, are used as platforms for supporting the weight and maintaining the stability of some other object, such as a camera, optical device, or the like. The connection or interface between tripods, bipods, and the like, and other objects such as cameras, optical devices, or the like, conventionally include mechanical locking mechanisms such as screw fasteners, screw clamps, or interference clamps, among others. These conventional locking mechanisms may be limited in their capabilities by using semi-permanent connection methods, requiring direct attention from the user to perform precise placement of the object into position, and can take a long time to secure or unsecure the object during installation and removal.

BRIEF SUMMARY

An apparatus for a magnetic stand mount, in one embodiment, includes a magnetic stand mount plate comprising a first at least one magnet, the magnetic stand mount plate configured to be coupled to an object. In one embodiment, the apparatus includes a magnetic stand mount base comprising a second at least one magnet and configured to be coupled to a stand. In one embodiment, the magnetic stand mount plate is selectively coupled to the magnetic stand mount base by magnetic attraction between the first at least one magnet and the second at least one magnet to secure the object to the stand.

A system for a magnetic stand mount, in one embodiment, includes a magnetic stand mount plate comprising a first at least one magnet, the magnetic stand mount plate configured to be coupled to an object. In one embodiment, the system includes a panhead comprising a second at least one magnet. In one embodiment, the magnetic stand mount plate is selectively coupled to the panhead by magnetic attraction between the first at least one magnet and the second at least one magnet to secure the object to the panhead.

A method for a magnetic stand mount, in one embodiment, includes providing a magnetic stand mount plate comprising a first at least one magnet, the magnetic stand mount plate configured to be coupled to an object. In one embodiment, the method includes providing a magnetic stand mount base comprising a second at least one magnet and configured to be coupled to a stand. In one embodiment, the method includes coupling the magnetic stand mount plate to the magnetic stand mount base.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
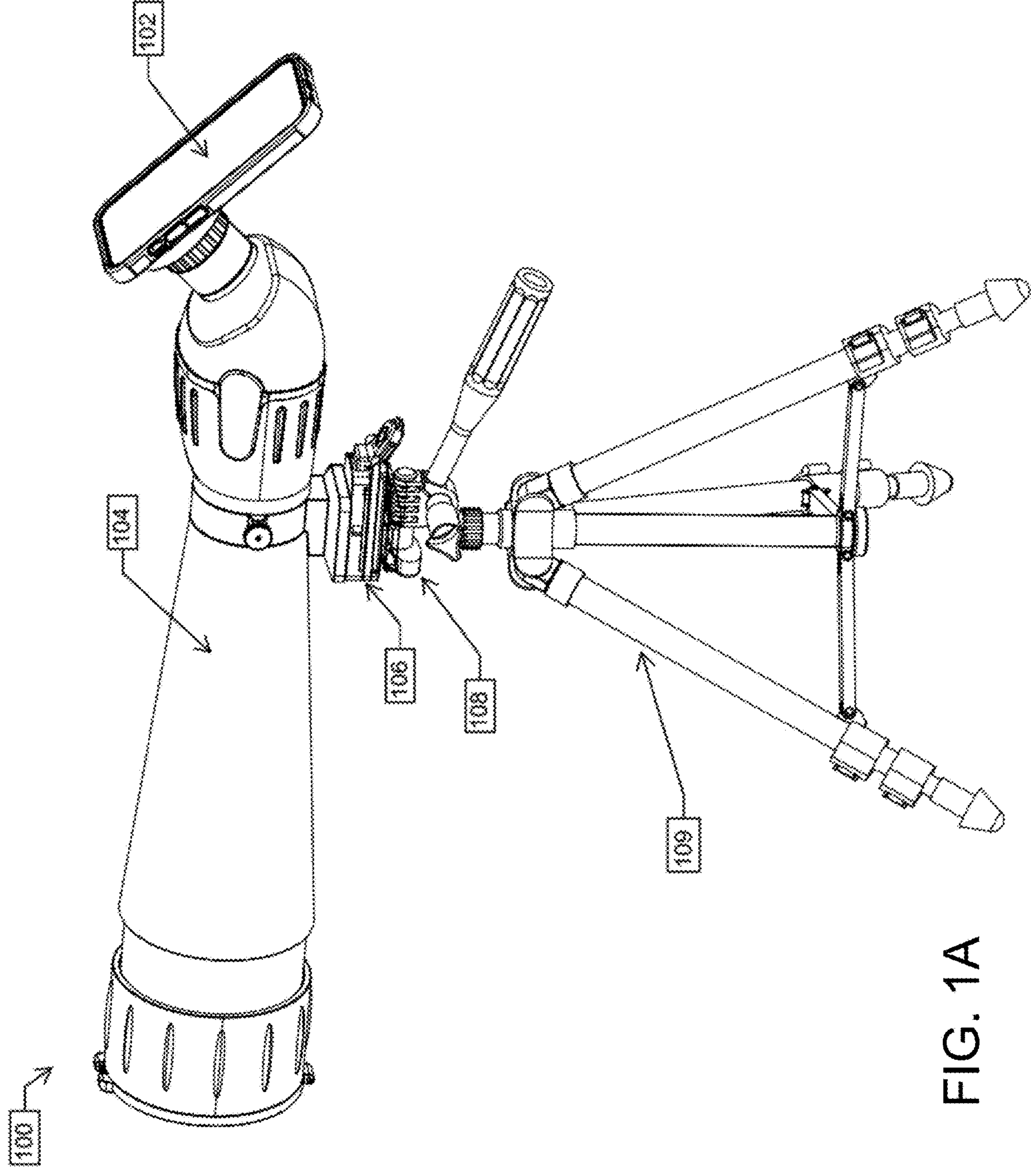
FIG. 1A illustrates an example embodiment of a system comprising a magnetic stand mount coupling an optical device to a tripod in accordance with the subject matter disclosed herein.

In general, the subject matter disclosed herein relates to stand mounts for tripods. In particular, the subject matter herein describes a magnetic quick-connect adapter for a stand, e.g., a quick-connect adapter for a tripod and a device to connect to the tripod. The quick connect adapter includes a portion that acts as a stand mount or base for a stand and a corresponding portion or plate that connects to an object and is selectively connected, aligned, and secured to the base using magnets, L-shaped locking features, and/or a releasable securing member. In this manner, an object such as a camera or a spotting scope can be quickly attached and removed from a stand mount or base without requiring removal of the stand mount or base from the stand.

An apparatus for a magnetic stand mount, in one embodiment, includes a magnetic stand mount plate comprising a first at least one magnet, the magnetic stand mount plate configured to be coupled to an object. In one embodiment, the apparatus includes a magnetic stand mount base comprising a second at least one magnet and configured to be coupled to a stand. In one embodiment, the magnetic stand mount plate is selectively coupled to the magnetic stand mount base by magnetic attraction between the first at least one magnet and the second at least one magnet to secure the object to the stand.

In one embodiment, the magnetic stand mount base comprises a plurality of locking members and the magnetic stand mount plate comprises a plurality of grooves that correspond to the plurality of locking members to further secure the magnetic stand mount plate to the magnetic stand mount base.

In one embodiment, the plurality of locking members comprise L-shaped locking members and the plurality of grooves comprise L-shaped grooves. In one embodiment, the magnetic stand mount base comprises an alignment ring that corresponds to an alignment ring of the magnetic stand mount plate. In one embodiment, the alignment ring of the magnetic stand mount base comprises an embossed alignment ring and the alignment ring of the magnetic stand mount plate comprises an engraved alignment ring.

In one embodiment, the magnetic stand mount base comprises a protruding member that is configured to fit into a slot on the magnetic stand mount plate to lock the magnetic stand mount plate to the magnetic stand mount base. In one embodiment, the protruding member is coupled to a release that is actuated to free the protruding member from the slot. In one embodiment, the release further comprises a securing member that secures the release to the magnetic stand mount base.

In one embodiment, the securing member comprises a spring-loaded member that is inserted into a corresponding slot on the magnetic stand mount base. In one embodiment, the securing member is depressed and locked into the release to free the securing member from the slot on the magnetic stand mount base.

In one embodiment, the first at least one magnet comprises at least one center ring-style magnet. In one embodiment, the first at least one magnet comprises an array of a plurality of magnets. In one embodiment, the second at least one magnet comprises at least one center ring-style magnet. In one embodiment, the second at least one magnet comprises an array of a plurality of magnets.

A system for a magnetic stand mount, in one embodiment, includes a magnetic stand mount plate comprising a first at least one magnet, the magnetic stand mount plate configured to be coupled to an object. In one embodiment, the system includes a panhead comprising a second at least one magnet. In one embodiment, the magnetic stand mount plate is selectively coupled to the panhead by magnetic attraction between the first at least one magnet and the second at least one magnet to secure the object to the panhead.

In one embodiment, the panhead comprises a plurality of locking members and the magnetic stand mount plate comprises a plurality of grooves that correspond to the plurality of locking members to further secure the magnetic stand mount plate to the panhead.

In one embodiment, the plurality of locking members comprise L-shaped locking members and the plurality of grooves comprise L-shaped grooves. In one embodiment, the panhead comprises an alignment ring that corresponds to an alignment ring of the magnetic stand mount plate. In one embodiment, the alignment ring of the panhead comprises an embossed alignment ring and the alignment ring of the magnetic stand mount plate comprises an engraved alignment ring.

In one embodiment, the panhead comprises a protruding member that is configured to fit into a slot on the magnetic stand mount plate to lock the magnetic stand mount plate to the panhead. In one embodiment, the protruding member is coupled to a release that is actuated to free the protruding member from the slot. In one embodiment, the release further comprises a securing member that secures the release to the panhead.

In one embodiment, the securing member comprises a spring-loaded member that is inserted into a corresponding slot on the panhead. In one embodiment, the securing member is depressed and locked into the release to free the securing member from the slot on the panhead.

In one embodiment, the first at least one magnet comprises at least one center ring-style magnet. In one embodiment, the first at least one magnet comprises an array of a plurality of magnets. In one embodiment, the second at least one magnet comprises at least one center ring-style magnet. In one embodiment, the second at least one magnet comprises an array of a plurality of magnets.

A method for a magnetic stand mount, in one embodiment, includes providing a magnetic stand mount plate comprising a first at least one magnet, the magnetic stand mount plate configured to be coupled to an object. In one embodiment, the method includes providing a magnetic stand mount base comprising a second at least one magnet and configured to be coupled to a stand. In one embodiment, the method includes coupling the magnetic stand mount plate to the magnetic stand mount base.

FIG. 1A illustrates an example embodiment of a system comprising a magnetic stand mount coupled to an optical device in accordance with the subject matter disclosed herein. In one example embodiment, the system 100 shows a digiscoping setup that includes a camera device 102, such as a smart phone, coupled to an optical device 104, such as a spotting scope, a camera, or the like. The optical device 104 is connected to a tripod 109 via a magnetic stand mount 106. As used herein, a tripod may refer to a three-legged stand for supporting an object (e.g., an optical device 104). Other stands may be used with the magnetic stand mount 106, however, such as bipods (two-legged structure) or other structures with multiple legs or supports.

In one embodiment, a magnetic stand mount 106 is coupled to the optical device 104. The magnetic stand mount 106, in one embodiment, is coupled to a panhead 108 for a stand such as a bipod, tripod, or the like. As used herein, a panhead may refer to a portion of the tripod that has a panning base that allows the object (e.g., the optical device) to move in any direction, e.g., up/down, left/right, diagonally, side to side, on an angle, and/or the like, via a swivel mechanism, a ball joint mechanism, or the like. For simplicity, the subject matter disclosed herein will be described with reference to a tripod 109; however, it is to be understood that various stands may be configured for receiving a magnetic stand mount 106 for mounting an object such as the optical device 104 to the stand.

Figure 1B:
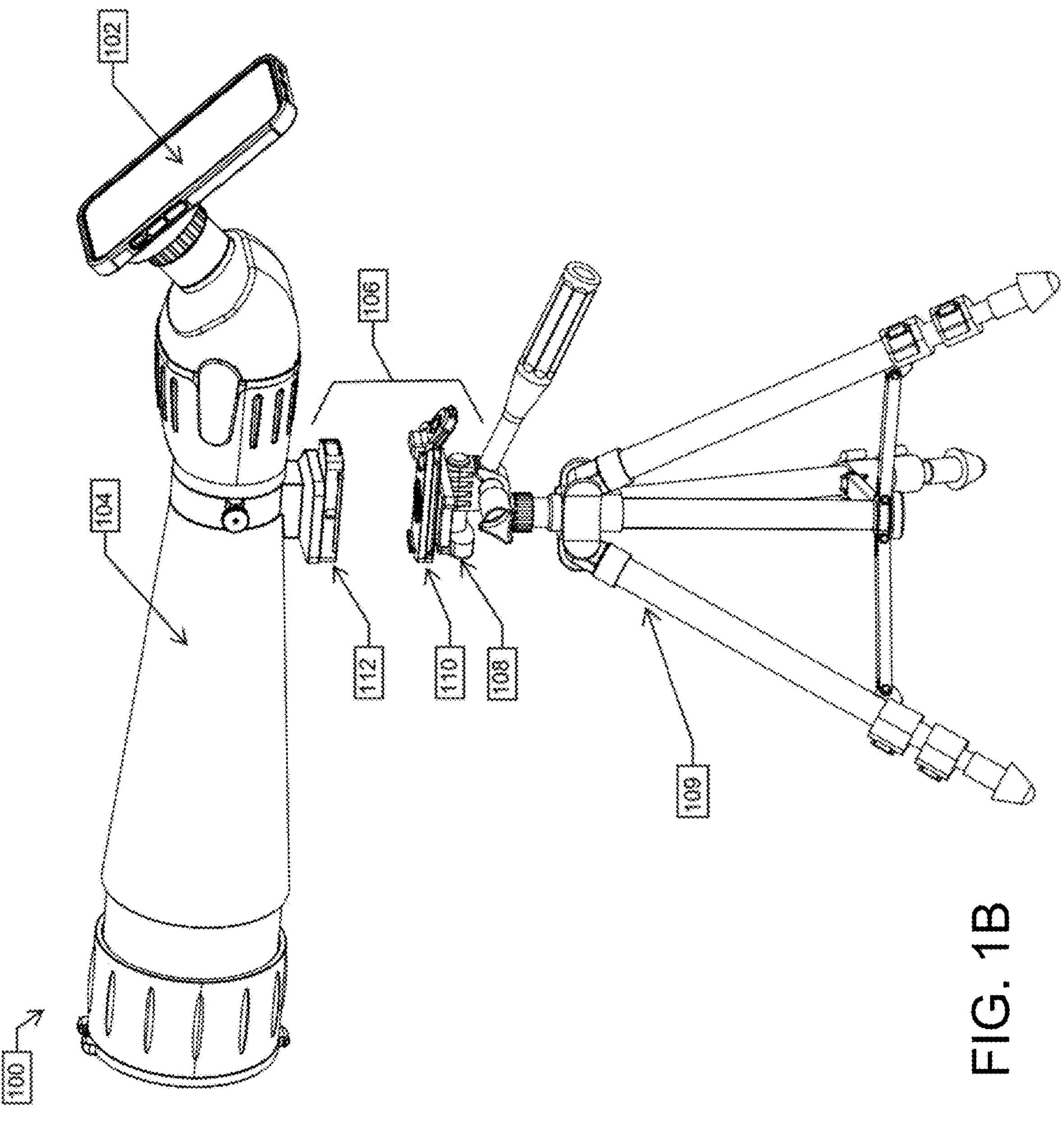
FIG. 1B illustrates an example embodiment of a system comprising a magnetic stand mount decoupling an optical device to a tripod in accordance with the subject matter disclosed herein.

FIG. 1B illustrates an example embodiment of a system comprising a magnetic stand mount decoupling an optical device to a tripod in accordance with the subject matter disclosed herein. In one embodiment, the system 100 shows a digiscoping setup that includes a camera device 102, such as a smart phone, coupled to an optical device 104, such as a spotting scope, a camera, or the like. When decoupled, the magnetic stand mount 106 is separable into the magnetic stand mount base 110, which is coupled to the a panhead 108, and a magnetic stand mount plate 112, which is coupled to the optical device 104. The magnetic stand mount 106 is described in more detail below.

Figure 2A:
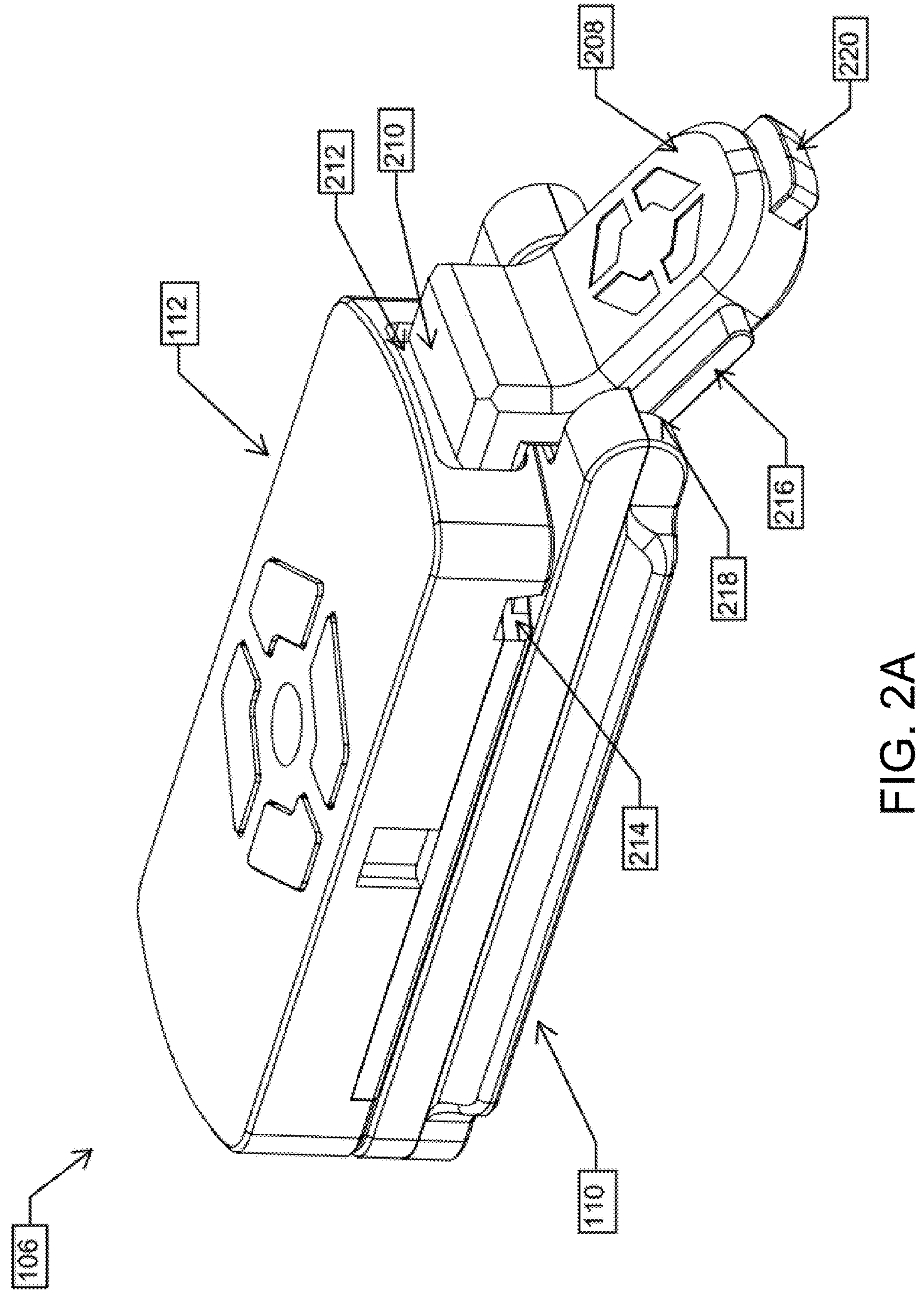
FIG. 2A illustrates an example embodiment of a magnetic stand mount in accordance with the subject matter disclosed herein.

FIG. 2A illustrates an example embodiment of a magnetic stand mount 106 in accordance with the subject matter disclosed herein. In one embodiment, the magnetic stand mount 106 includes a magnetic stand mount plate 112 that is coupleable or mountable to an object, e.g., an optical device such as a camera body, e.g., a digital single-lens reflex ("DSLR") camera, a video camera, a spotting scope, and/or the like, that is being mounted to the stand, e.g., the tripod. For example, the magnetic stand mount plate 112 may screw onto the object or use other means of attachment such as magnets, adhesives, hook and loop fasteners, clips, snaps, a friction fit, and/or the like.

In one embodiment, the magnetic stand mount 106 includes a magnetic stand mount base 110 or component that is connected to a stand, e.g., a panhead 108 of a tripod 109. In one embodiment, the magnetic stand mount base 110 connects the magnetic stand mount 106 to a stand such as a tripod, e.g., an Arca-Swiss style tripod system. The magnetic stand mount base 110 may be inserted and secured in a slot, groove, opening, or some other aperture in the top of the stand that corresponds to a shape and/or size of the magnetic stand mount base 110. Furthermore, the magnetic stand mount base 110, when inserted into the top of the stand, may be secured to the stand using a clip, snap, friction fit, a set screw, and/or the like.

In one embodiment, the magnetic stand mount base 110 comprises the stand-side of a magnetic adapter that magnetically couples the magnetic stand mount plate 112 to the magnetic stand mount base 110. In one embodiment, the magnetic stand mount base 110 includes an embossed alignment ring (not shown) and L-shaped locking members (not shown), as described in more detail below.

In one embodiment, the magnetic stand mount plate 112 is magnetically coupled to the magnetic stand mount base 110 using one or more magnets in or on the magnetic stand mount plate 112 that corresponds to magnets located in or on the magnetic stand mount base 110. For instance, the magnetic stand mount plate 112 may include an engraved alignment ring (not shown) and matching L-shaped locking grooves 214 that correspond to or match the embossed alignment ring (not shown) and L-shaped locking members (not shown) of the magnetic stand mount base 110.

Thus, in one embodiment, the magnetic stand mount plate 112 is selectively removeable from the magnetic stand mount base 110. In certain embodiments, the magnetic stand mount plate 112 may further be secured to the magnetic stand mount base 110 using a secondary securing member, in this case, a protruding member 210 of the magnetic stand mount base 110 that corresponds to a slot 212 in the magnetic stand mount plate 112. In such an embodiment, a release 208 (or trigger) may be coupled to the magnetic stand mount base 110 and may be actuated to release the protruding member 210 from the slot 212 in the magnetic stand mount plate 112, and ultimately release the magnetic stand mount plate 112 from the magnetic stand mount base 110. In one embodiment, the release 208 is spring-loaded or otherwise put under tension such that pressure is needed to actuate the release and separate the protruding member 210 from the slot 212.

In one embodiment, the release 208 or trigger may be secured to the magnetic stand mount base 110 using a securing member 216 or locking body located along an edge of the release 208. In one embodiment, the securing member 216 is forced or biased outward or away from the release 208 by a spring or other mechanical component. In such an embodiment, the securing member 216 corresponds to a slot 218 or groove in the magnetic stand mount base 110 such that the securing member 216 is forced, moved, or biased into the slot 218 via the spring to lock or secure the securing member 216 into the slot 218.

In one embodiment, to release the securing member 216 from the slot 218, the securing member 216 may be depressed and pushed into the release 208. In such an embodiment, the securing member 216 may be secured or locked in the release 208. This allows the release 208 to be actuated to release the protruding member 210 from the slot 212 in the magnetic stand mount plate 112, and ultimately release the magnetic stand mount plate 112 from the magnetic stand mount base 110. Once depressed and locked, the securing member 216 may be unlocked and released from the release 208 by actuating the lock release 220. In such an embodiment, the lock release 220 is mechanically coupled to the securing member 216 within the release 208 to actuate the securing member 216, and/or a component that secures the securing member 216 within the release 208, to unlock and release the securing member 216.

Figure 2B:
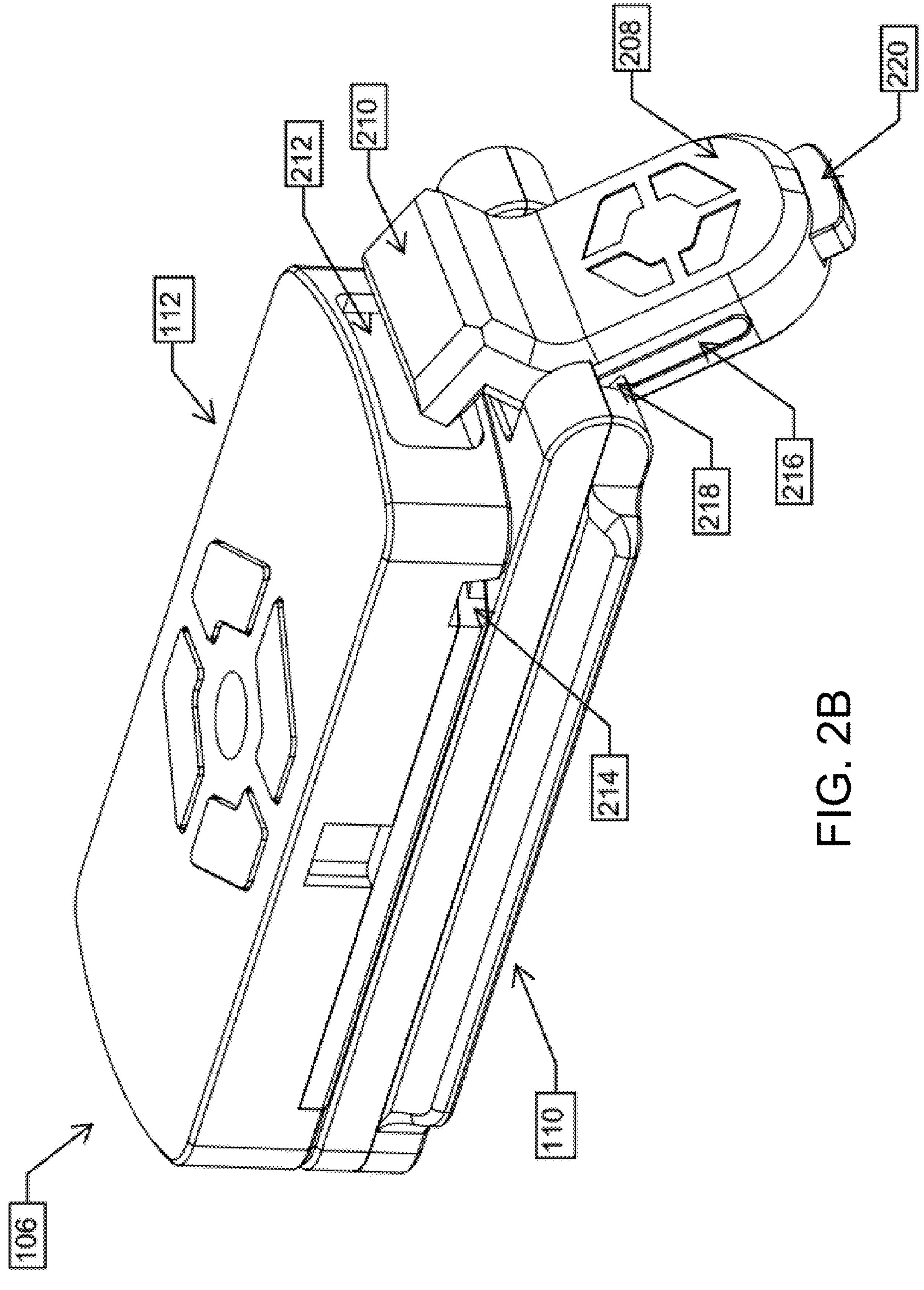
FIG. 2B illustrates an example embodiment of a magnetic stand mount in accordance with the subject matter disclosed herein.

FIG. 2B illustrates an example embodiment of a magnetic stand mount 106 in accordance with the subject matter disclosed herein. Here, FIG. 2B illustrates an example of actuating the release 208. In one embodiment, to actuate the release 208 that is locked into the slot 218, the securing member 216 is depressed (and locked into the release 208) and pressure is applied on the release 208 (e.g., the release 208 is pushed down) to separate the protruding member 210 from the slot 212. In such an embodiment, however, the magnetic stand mount plate 112 remains coupled or secured to the magnetic stand mount base 110 via one or more magnets in the magnetic stand mount base 110 and the magnetic stand mount plate 112 as well as the L-shaped locking members (not shown) within the matching L-shaped locking groves 214.

Figure 2C:
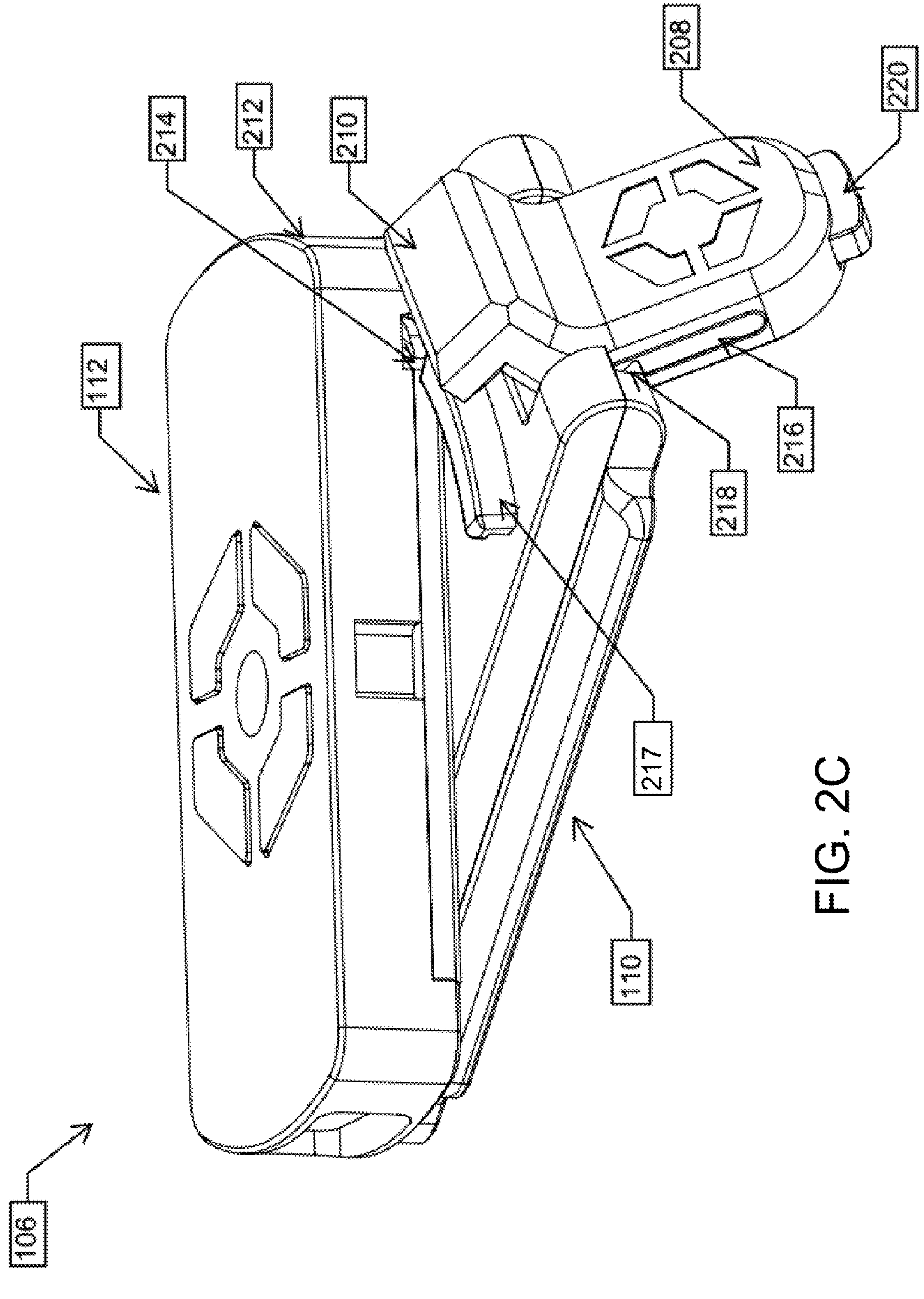
FIG. 2C illustrates an example embodiment of a magnetic stand mount in accordance with the subject matter disclosed herein.

FIG. 2C illustrates an example embodiment of a magnetic stand mount 106 in accordance with the subject matter disclosed herein. In the depicted example, to remove the magnetic stand mount plate 112 from the magnetic stand mount base 110, the magnetic stand mount plate 112 may be twisted or turned to (1) weaken or break the magnetic attraction between the magnets in the magnetic stand mount plate 112 and magnets in the magnetic stand mount base 110 and (2) to remove the magnetic stand mount plate 112 from the L-shaped locking members 217 that may be located on the top surface of the magnetic stand mount base 110 and correspond to L-shaped locking grooves 214 in the magnetic stand mount plate 112. In one embodiment, the L-shaped locking members 217 further secure the magnetic stand mount plate 112 to the magnetic stand mount base 110 and align the magnetic stand mount plate 112 with the magnetic stand mount base 110.

Figure 2D:
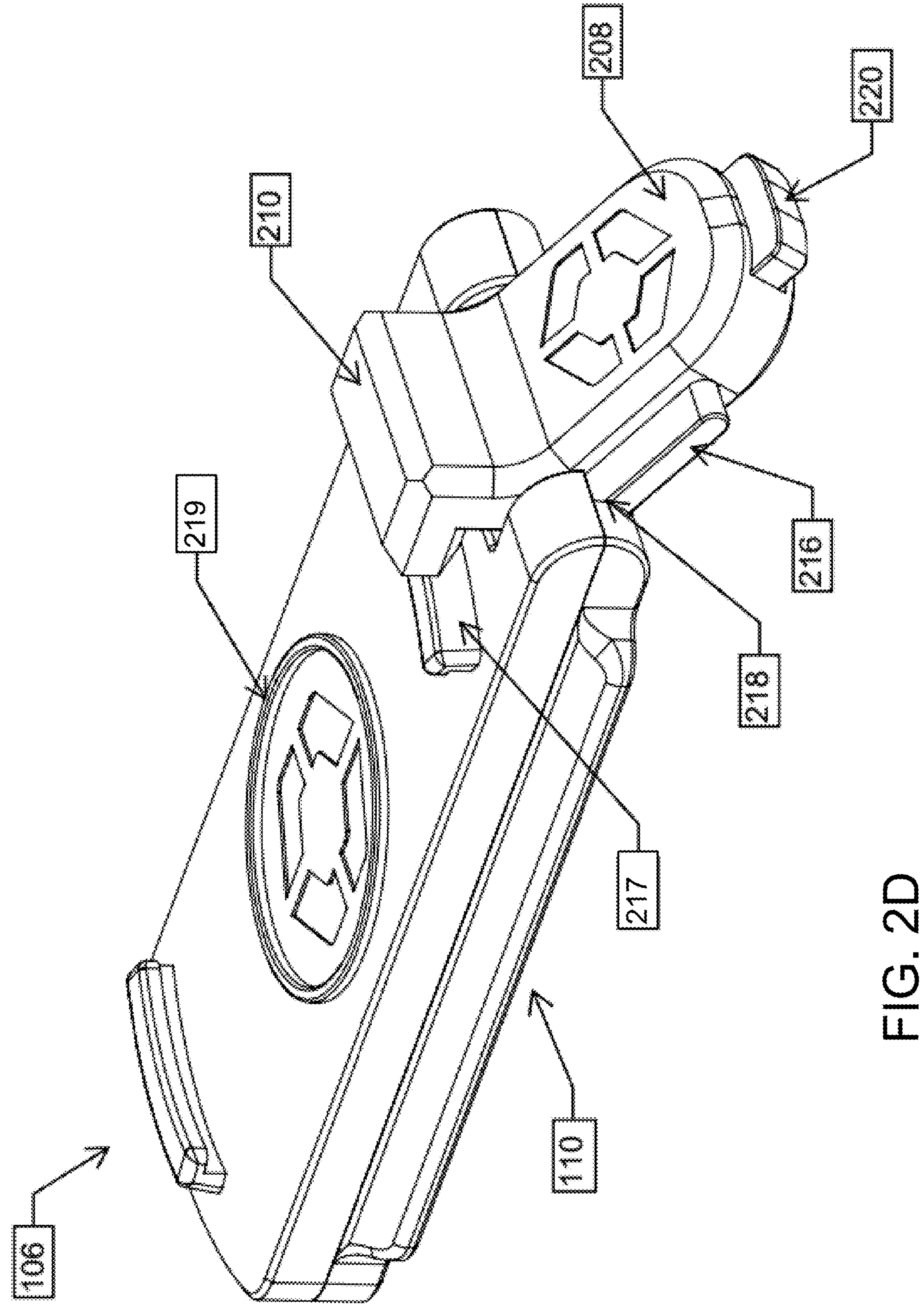
FIG. 2D illustrates an example embodiment of a magnetic stand mount in accordance with the subject matter disclosed herein.

FIG. 2D illustrates an example embodiment of a magnetic stand mount 106 in accordance with the subject matter disclosed herein. FIG. 2D depicts a perspective view of the magnetic stand mount base 110, which includes the L-shaped locking members 217 and an embossed alignment ring 219, which work together to align the magnetic stand mount plate 112 with the magnetic stand mount base 110, which assists with quick and easy installation of the magnetic stand mount plate 112 with the magnetic stand mount base 110, and also secures the magnetic stand mount plate 112 to the magnetic stand mount base 110.

Figure 2E:
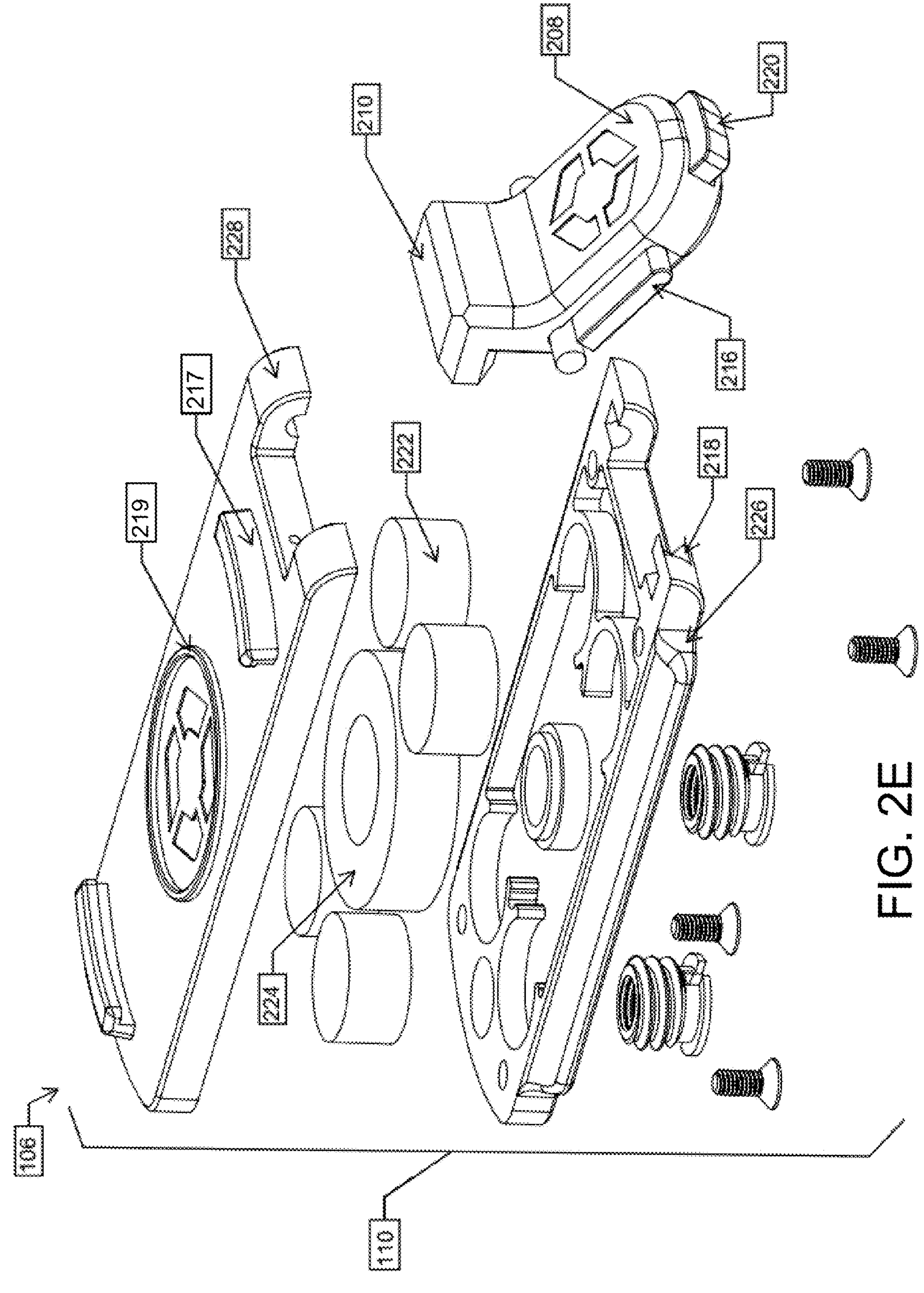
FIG. 2E illustrates an example embodiment of a magnetic stand mount in accordance with the subject matter disclosed herein.

FIG. 2E illustrates an example embodiment of a magnetic stand mount 106 in accordance with the subject matter disclosed herein. In particular, FIG. 2E depicts an exploded view of an example configuration of a magnetic stand mount base 110. In one embodiment, the magnetic stand mount base 110 includes a base member 226, which may be configured directly into a panhead assembly (like FIG. 3) or be configured to be compatible with existing panhead connection interfaces such as an Arca-Swiss style adapter.

In one embodiment, the base member 226 is coupled to a base cover member 228, e.g., using screws, an adhesive, clips, snaps, a friction fit, or the like. In one embodiment, the magnetic stand mount base 110 includes one or more base magnets 222, 224 that the base member 226 and base cover member 228 are configured to retain or secure.

In one embodiment, a single base magnet 224 may be used, or an array of base magnets 222, 224 may be positioned between the base member 226 and base cover member 228, as shown in FIG. 2E. In such an embodiment, an array of base magnets 222, 224 may include a center ring-style magnet 224 with multiple cylindrical magnets 222 positioned around the ring-style magnet 224. In one embodiment, the configuration of the base magnets 222, 224 is selected according to a configuration of corresponding plate magnets located with the magnetic stand mount plate 112, shown in FIG. 2F.

In one embodiment, the base cover member 228 acts as a cover and encapsulates the base magnets 222, 224, when assembled. In one embodiment, an inside or underside (not shown) of the base cover member 228 may be formed with grooves, insets, indentations, or the like that match the shape and sizes of the base magnets 222, 224, which helps secure the base magnets 222, 224 in place. Further, the release 208 may be coupled to the base cover member 228 using a hinge, pin, or other mechanism that allows the release to rotate or move when actuated.

Figure 2F:
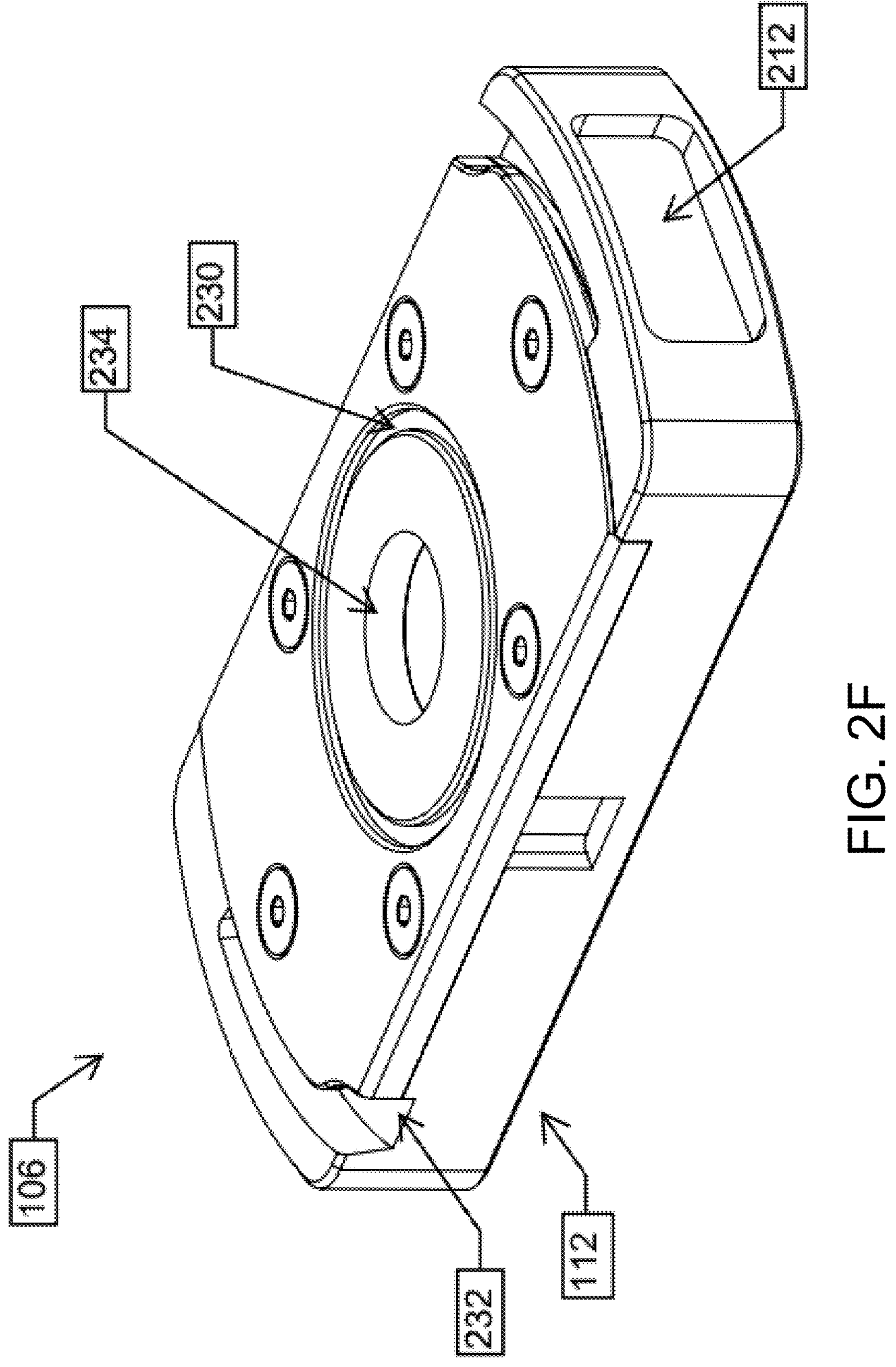
FIG. 2F illustrates an example embodiment of a magnetic stand mount in accordance with the subject matter disclosed herein.

FIG. 2F illustrates an example embodiment of a magnetic stand mount 106 in accordance with the subject matter disclosed herein. FIG. 2F depicts a bottom side of the magnetic stand mount plate 112, which includes an engraved alignment ring 230 that matches or corresponds to the shape and size of the embossed alignment ring 219 on the top surface of the magnetic stand mount base 110, e.g., on the top of the base cover member 228 and L-shaped locking grooves 232 that match or correspond to the shape and size of the L-shaped locking members 217 on the top surface of the magnetic stand mount base 110. Magnets within the magnetic stand mount plate 112 are attracted to the magnets in the magnetic stand mount base 110 to secure the magnetic stand mount plate 112 to the magnetic stand mount base 110, as shown above with reference to FIGS. 2A-2F.

Figure 2G:
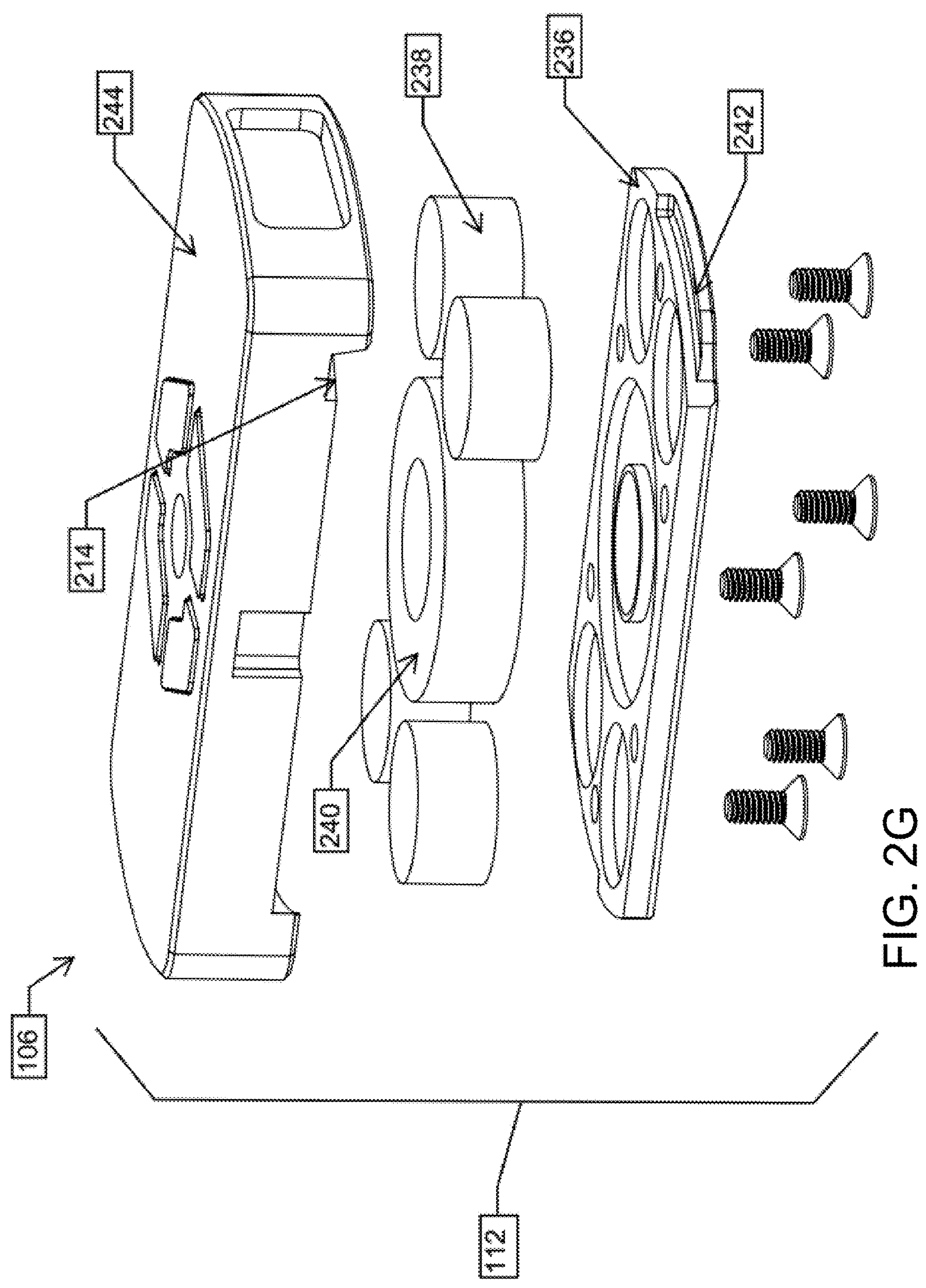
FIG. 2G illustrates an example embodiment of a magnetic stand mount in accordance with the subject matter disclosed herein.

FIG. 2G illustrates an example embodiment of a magnetic stand mount 106 in accordance with the subject matter disclosed herein. In one embodiment, FIG. 2G depicts an exploded view of an example configuration of a magnetic stand mount plate 112, e.g., the section of the magnetic stand mount 106 that is connected to an object such as an optical device. The magnetic stand mount plate 112 may include a plate magnet retaining plate 236 that includes grooves, insets, indentations, or the like that match the size and shape of the plate magnets 238, 240 to hold the plate magnets 238, 240 in place and alignment with the base magnets 222, 224, and grooves 242 that form part of the L-shaped locking grooves 214 that correspond to the L-shaped locking members 217. In one embodiment, the plate magnet retaining plate 242 has an engraved alignment ring 230 on its back side that matches the embossed alignment ring 219 on the magnetic stand mount base 110.

In one embodiment, the plate magnets 238, 240 may be substantially similar to the base magnets 222, 224 in size, shape, strength, type, and/or the like. In one embodiment, the plate magnets 238, 240 include an array of magnets that includes cylindrical magnets 238 that surrounds a center ring-style magnet 240.

In one embodiment, the magnetic stand mount plate 112 includes a plate cover member 244 that acts as a cover and encapsulates the plate magnets 238, 240, when assembled. In one embodiment, the plate cover member 244 includes L-shaped locking grooves 214 that are configured (shaped and sized) to receive the L-shaped locking members 217 of the magnetic stand mount base 110 and further secure the magnetic stand mount plate 112 to the magnetic stand mount base 110 when the magnetic stand mount plate 112 is connected to the magnetic stand mount base 110.

Figure 3:
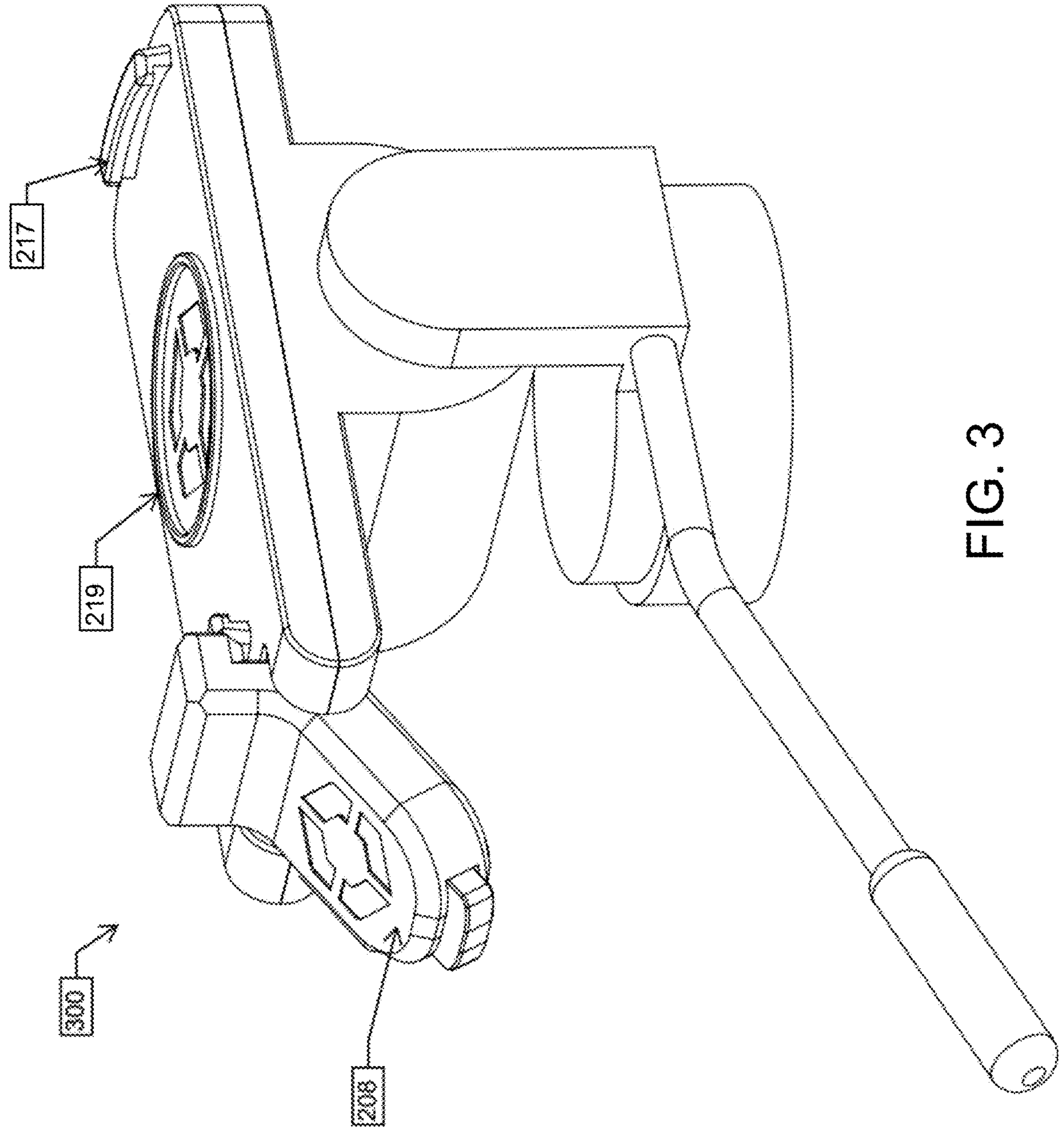
FIG. 3 illustrates an example embodiment of a magnetic stand mount in accordance with the subject matter disclosed herein.

FIG. 3 illustrates an example embodiment of a magnetic stand mount in accordance with the subject matter disclosed herein. In the depicted embodiment, a mount 300 may be embodied as a magnetic stand mount base 110, or portions of a magnetic stand mount base 110, that may be integrated directly into a panhead for a tripod and may include the features, structures, or elements of the magnetic stand mount base 110 described above.

In one embodiment, the mount 300 is fixedly coupled to the tripod so that it can't be adjusted, or is movably coupled (e.g., via a hinge, joint, or other adjustable member) so that the mount 300 can be adjusted, e.g., to pan about a horizontal axis, to tilt along a vertical axis, and/or move along a diagonal axis. In such an embodiment, having the structural elements of the magnetic stand mount base 110 integrated into the panhead allows for quicker and easier mounting and removing of an optics to/from the tripod without requiring a user to manually install a magnetic stand mount base 110 of the magnetic stand mount 106 into the tripod panhead. In certain embodiments, the mount 300 may be selectively removed from a tripod and replaced with a different mount 300 to accommodate different magnetic stand mount plates 112 that are installed on an object such as an optical device like a camera, spotting scope, or the like.

Figure 4:
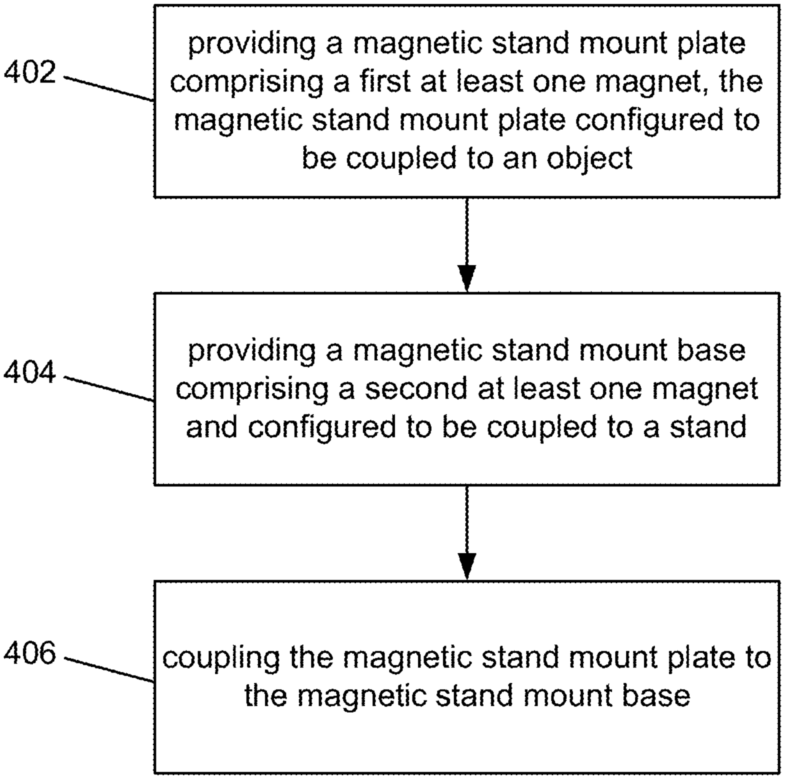
FIG. 4 depicts one embodiment of a method for a magnetic stand mount.

FIG. 4 depicts one embodiment of a method for a magnetic stand mount. In one embodiment, the method 400 begins and provides 402 a magnetic stand mount plate comprising a first at least one magnet, the magnetic stand mount plate configured to be coupled to an object. In one embodiment, the method 400 provides 404 a magnetic stand mount base comprising a second at least one magnet and configured to be coupled to a stand. In one embodiment, the method 400 couples the magnetic stand mount plate to the magnetic stand mount base, and the method 400 ends.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
- a magnetic stand mount plate comprising a first at least one magnet, the magnetic stand mount plate configured to be coupled to an object; and
- a magnetic stand mount base comprising a second at least one magnet and configured to be coupled to a stand,
- wherein the magnetic stand mount plate is selectively coupled to the magnetic stand mount base by magnetic attraction between the first at least one magnet and the second at least one magnet to secure the object to the stand, and
- wherein the magnetic stand mount base comprises a protruding member that is configured to fit into a slot on the magnetic stand mount plate to secure the magnetic stand mount plate to the magnetic stand mount base, and wherein the protruding member is coupled to a release that is actuated to free the protruding member from the slot, and wherein the release further comprises a securing member that secures the release to the magnetic stand mount base.

2. The apparatus of claim 1, wherein the magnetic stand mount base comprises a plurality of locking members and the magnetic stand mount plate comprises a plurality of grooves that correspond to the plurality of locking members to further secure the magnetic stand mount plate to the magnetic stand mount base.

3. The apparatus of claim 2, wherein the plurality of locking members comprise L-shaped locking members and the plurality of grooves comprise L-shaped grooves.

4. The apparatus of claim 1, wherein the magnetic stand mount base comprises an alignment ring that corresponds to an alignment ring of the magnetic stand mount plate.

5. The apparatus of claim 4, wherein the alignment ring of the magnetic stand mount base comprises an embossed alignment ring and the alignment ring of the magnetic stand mount plate comprises an engraved alignment ring.

6. The apparatus of claim 1, wherein the securing member comprises a spring-loaded member that is inserted into a corresponding slot on the magnetic stand mount base.

7. The apparatus of claim 6, wherein the securing member is depressed and locked into the release to free the securing member from the slot on the magnetic stand mount base.

8. The apparatus of claim 1, wherein the first at least one magnet comprises at least one center ring-style magnet.

9. The apparatus of claim 1, wherein the first at least one magnet comprises an array of a plurality of magnets.

10. The apparatus of claim 1, wherein the second at least one magnet comprises at least one center ring-style magnet.

11. The apparatus of claim 1, wherein the second at least one magnet comprises an array of a plurality of magnets.

12. A system comprising:
- a magnetic stand mount plate comprising a first at least one magnet, the magnetic stand mount plate configured to be coupled to an object; and
- a panhead comprising a second at least one magnet; and
- wherein the magnetic stand mount plate is selectively coupled to the panhead by magnetic attraction between the first at least one magnet and the second at least one magnet to secure the object to the panhead, and
- wherein the panhead comprises a protruding member that is configured to fit into a slot on the magnetic stand mount plate to secure the magnetic stand mount plate to the panhead, and wherein the protruding member is coupled to a release that is actuated to free the protruding member from the slot, and wherein the release further comprises a securing member that secures the release to the panhead.

13. The system of claim 12, wherein the panhead comprises a plurality of locking members and the magnetic stand mount plate comprises a plurality of grooves that correspond to the plurality of locking members to further secure the magnetic stand mount plate to the panhead.

14. The system of claim 13, wherein the plurality of locking members comprise L-shaped locking members and the plurality of grooves comprise L-shaped grooves.

15. The system of claim 12, wherein the panhead comprises an alignment ring that corresponds to an alignment ring of the magnetic stand mount plate.

16. The system of claim 15, wherein the alignment ring of the panhead comprises an embossed alignment ring and the alignment ring of the magnetic stand mount plate comprises an engraved alignment ring.

17. A method, comprising:
- providing a magnetic stand mount plate comprising a first at least one magnet, the magnetic stand mount plate configured to be coupled to an object;
- providing a magnetic stand mount base comprising a second at least one magnet and configured to be coupled to a stand; and coupling the magnetic stand mount plate to the magnetic stand mount base, wherein the magnetic stand mount base comprises a protruding member that is configured to fit into a slot on the magnetic stand mount plate to secure the magnetic stand mount plate to the magnetic stand mount base, and wherein the protruding member is coupled to a release that is actuated to free the protruding member from the slot, and wherein the release further comprises a securing member that secures the release to the magnetic stand mount base.

* * * * *